March 24, 1964 R. G. KROPP 3,126,184
CLIP TYPE CABLE FASTENING DEVICE
Filed Oct. 16, 1961 3 Sheets-Sheet 1
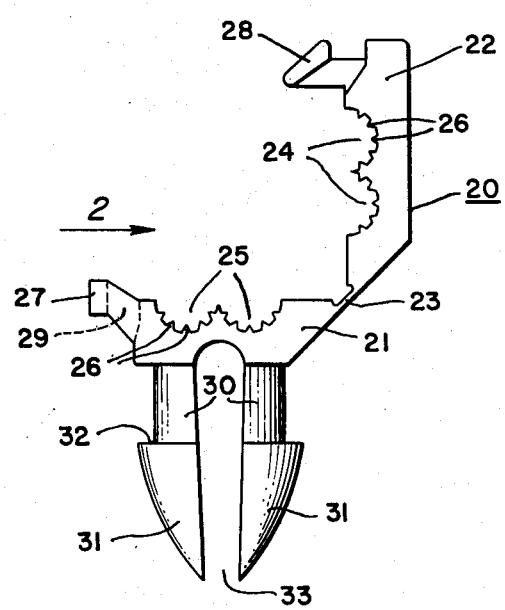
Fig. 1
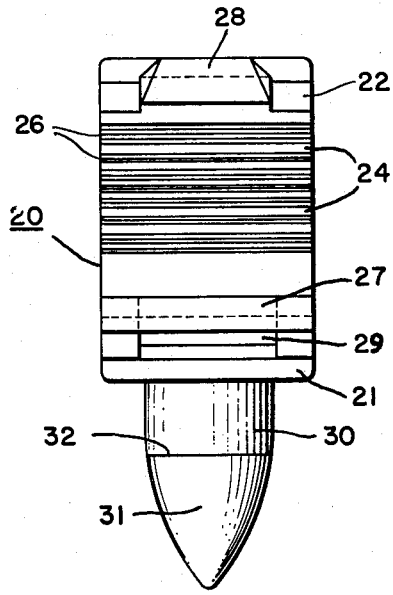
Fig. 2
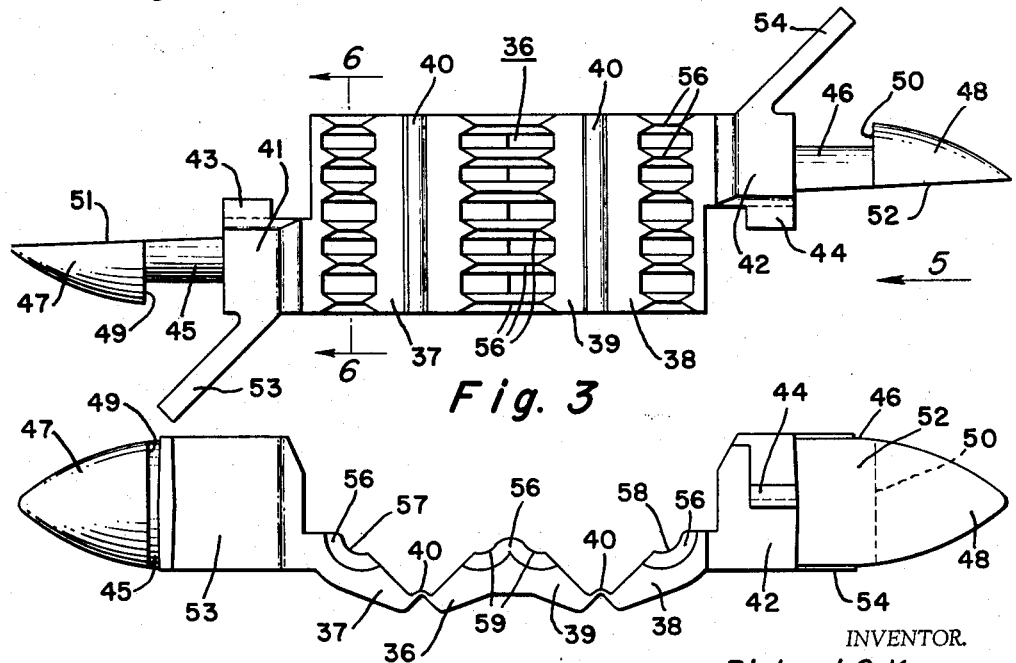
Fig. 3
Fig. 4
INVENTOR.
Richard G. Kropp
BY
His Attorney

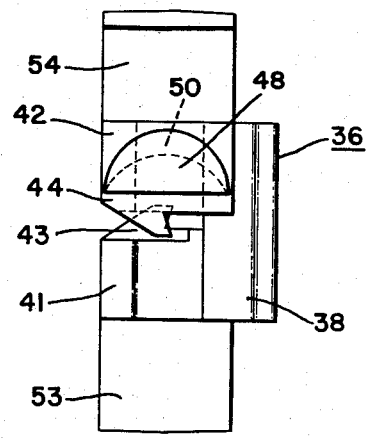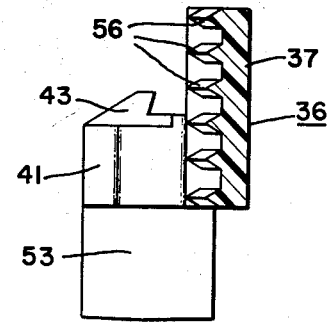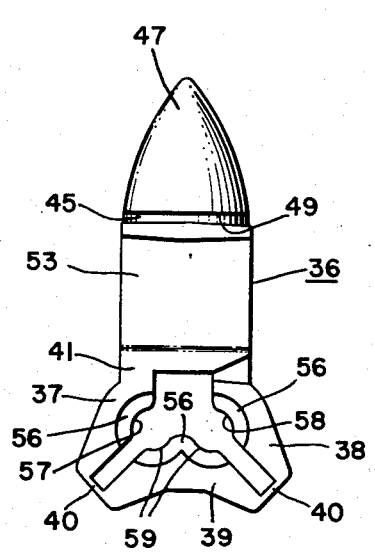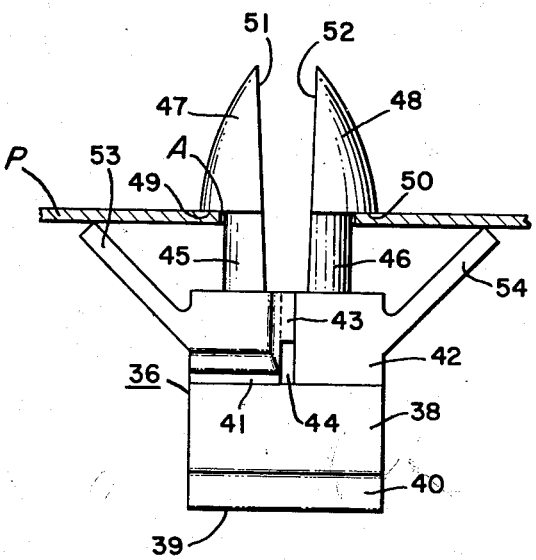

March 24, 1964     R. G. KROPP     3,126,184
CLIP TYPE CABLE FASTENING DEVICE
Filed Oct. 16, 1961     3 Sheets-Sheet 3
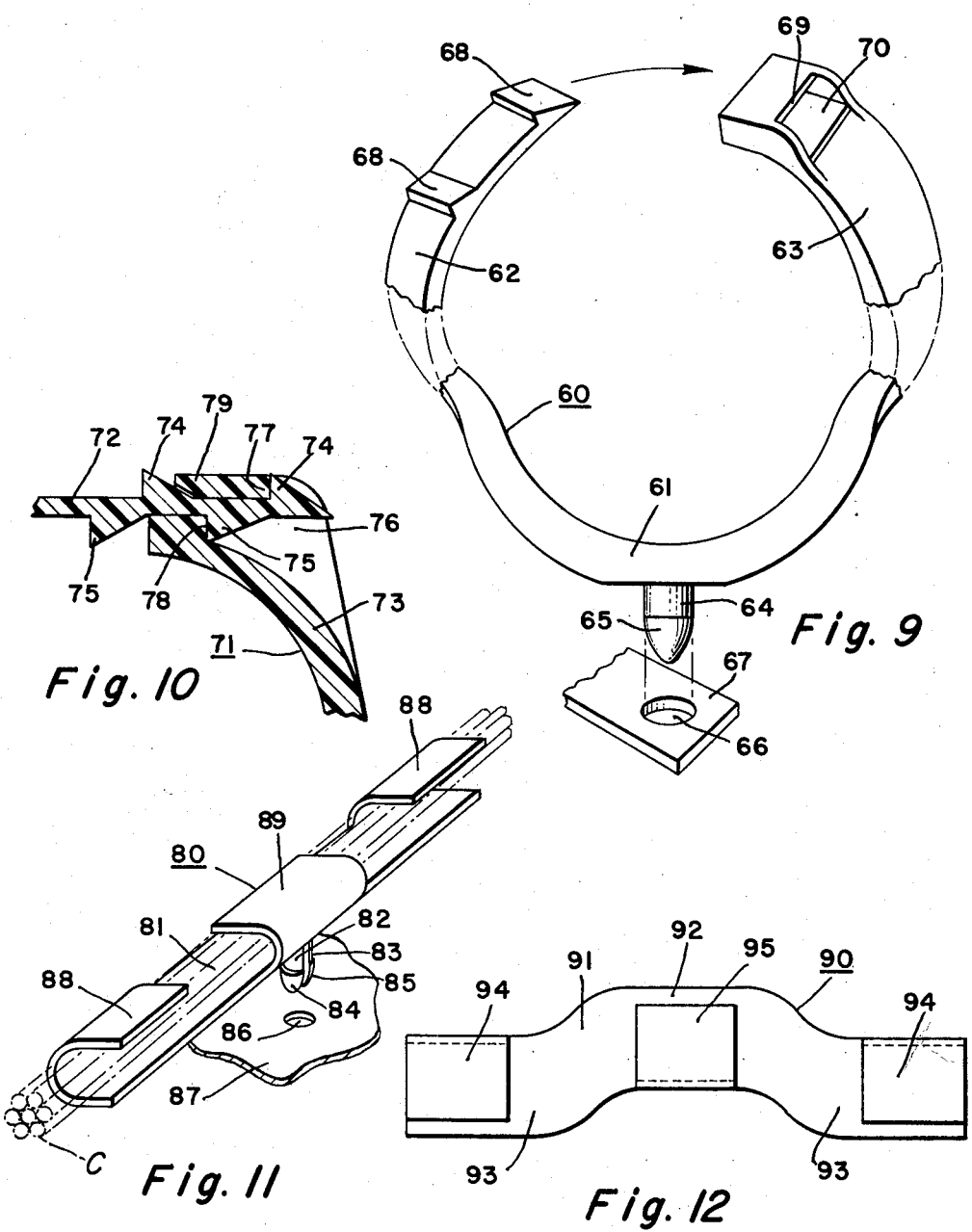
INVENTOR.
Richard G. Kropp
BY
Albert H. Reuther
His Attorney

United States Patent Office 3,126,184
Patented Mar. 24, 1964

3,126,184
CLIP TYPE CABLE FASTENING DEVICE
Richard G. Kropp, Girard, Ohio, assignor to General
Motors Corporation, Detroit, Mich., a corporation of
Delaware
Filed Oct. 16, 1961, Ser. No. 145,396
5 Claims. (Cl. 248—73)

This invention relates to a retainer means and, more particularly, to a one-piece device which can be used to mount and retain articles such as rods, tubes as well as wiring to be secured to an apertured mounting panel.

An object of this invention is to provide a new and improved one-piece mounting device of moldable plastic material which can embrace longitudinally extending articles free of any tape covering and readily assembled into position.

Another object of this invention is to provide an all-plastic clip device having a body portion including a barbed mounting lug means to fit a mounting panel aperture and a single hinge portion integrally pivotal into a latching position with the body portion to provide a serrated gripping periphery for one to two conductors or wires in a generally 8-shaped passage formed therebetween.

Another object of this invention is to provide an all-plastic cable clip means including a pair of opposite though complementary hinge portions joined by an intermediate body portion each having cable grip ribbing integral therewith and adapted to be interlocked to have alignment of nose-like barbed lug means formed integrally with each hinge portion each of which also has an angularly positioned flange means to engage one side of a mounting panel while enhancing spreading of the nose-like barbed lug means, each flange means and hinge portion being collectively engageable along opposite surfaces for accomplishing separation of identical mating hinge portions embraceable about longitudinal extending wiring or conductor means.

A further object of this invention is to provide an all-plastic cable mounting clip means free of tape covering and including a substantially longitudinally extending body portion with a barbed nose-like lug means extending centrally to one side thereof and having three flange extensions integral on an opposite side to have an outer pair of the flange extensions located in one direction and the third flange extension located therebetween in an opposing direction.

Another object of this invention is to provide an all-plastic locking-type harness clip means having a generally angular body portion with oppositely extending though mating tapered ends and a nose-like barbed lug means extending radially outwardly from a thickened mid section thereof, one of the ends having a shoulder-forming passage therein to receive a multi-ribbed opposite free end in closed-loop interlock.

Further objects and advantages of the present invention will be apparent from the following description, reference being had to the accompanying drawings wherein preferred embodiments of the present invention are clearly shown.

In the drawings:

FIGURE 1 is a side view of an all-plastic clip device including a single hinge portion with a serrated gripping periphery for one to two conductors or wires in accordance with the present invention.

FIGURE 2 is an elevational view of the clip device taken in the direction of arrow 2 in FIGURE 1.

FIGURE 3 is a top view of an all-plastic cable clip means including a pair of opposite though complementary hinge and flange portions joined by an intermediate body portion each serrated and having complementary nose-like lug means on each of the hinge portions adapted to interlock in accordance with the present invention.

FIGURE 4 is a side view of the cable clip means of FIGURE 3.

FIGURE 5 is an end view in the direction of arrow 5 in FIGURE 3.

FIGURE 6 is a cross-sectional view taken along line 6—6 in FIGURE 3.

FIGURES 7 and 8 provide folded side and elevational views, respectively of the cable clip means of FIGURE 3.

FIGURE 9 is an exploded view of another embodiment of all-plastic locking-type harness clip means having a generally angular body portion.

FIGURE 10 is a fragmentary interlock of modified opposite ends of clip means similar in structure to that illustrated in FIGURE 9.

FIGURE 11 is a perspective view of a cable mounting clip means with triple flanging to embrace longitudinally extending members mountable adjacent to an apertured panel.

FIGURE 12 is a top view of a cable clip means similar to that of FIGURE 11 though centrally offset.

In a motor vehicle such as an automobile, truck and the like there is a multiplicity of components such as tubular fuel lines as well as grouped conductors in harness means as well as single conductors in wiring all of which need to be transferred from one location to another for particular purposes and all of which require anchoring or fastening adjacent to an apertured mounting panel. Sometimes servicing of components is necessary and then such tubular components as well as wiring must be removable and accessible without extensive damage or replacement of any retaining covering or wrapping of tape and the like. In FIGURE 1 there is shown one embodiment of an all-plastic clip device generally indicated by numeral 20 and having body structure made entirely of moldable plastic material. The clip device 20 shown in FIGURES 1 and 2 as molded in an open condition includes substantially complementary first and second body portions 21 and 22 integrally joined to each other by a web-like hinge means 23 of a substantially reduced thickness of plastic material having substantially parallel opposite surfaces thereon. Each of the first and second body portions 21—22 includes a pair of semi-arcuate recesses 24—25, respectively, and these recesses have a serrated gripping periphery due to radially inwardly extending V-shaped ribs 26 and two wires or conductors as well as tubular conduits or rods can be engaged longitudinally by these ribs 26 for resilient mounting in the recesses 24—25. The web-like hinge means 23 permits mating engagement and flexing of the second body portion 22 to fit adjacent to the first body portion 21 with latching or interlock means being provided therebetween. This latching or interlock means can include a substantially U-shaped extension 27 integral with the first body portion as well as a centrally located tapered projection 28 integral with the second body portion and adapted to be press-fitted or wedged into interference with a periphery of a passage 29 formed by the U-shaped extension 27 as integral with the first body portion 21.

As can be seen in FIGURES 1 and 2, the first body portion 21 of the clip device 20 also includes a laterally extending shank portion 30 rounded on opposite sides and terminating in barbed lug means 31 integral therewith and providing a pair of opposite shoulders or abutments 32 adapted to engage one side of an apertured mounting panel. The other side of the apertured mounting panel can be engaged directly by a surface of the first body portion 21 in locations adjacent to where the shank portion 30 having rounded outer sides is integral with the first body portion. As can be seen in FIGURE 1, the shank and lug means 30—31 can be split by a slot or cutout 33 extending centrally therebetween so as to permit resilient flexing of the barbed lug means 31 toward each other for fitting the clip device 20 to an apertured mounting panel on a vehicle.

In FIGURES 3 through 6 there is illustrated an all-plastic cable clip means generally indicated by numeral 36 including first and second hinged body portions identified by reference numerals 37 and 38, respectively. There is also an intermediate body portion 39 made integral with the hinged body portions 37—38 by means of a pair of reduced thickness hinge means 40. These hinge means 40 permit flexing and folding of the first and second body portions 37—38 relative to the intermediate body portion 39 as best seen in FIGURES 7 and 8. The all-plastic clip means 36 is formed in an open state or condition as represented in FIGURES 3 and 4 and only a pair of complementary mold pieces are required to form relatively symmetrical components of moldable plastic material in a unitary piece. Integral with the first and second hinged body portions 37—38 there are generally J-shaped interlock means 41 and 42, respectively, each of which have latching shoulders, abutments or projections 43 and 44, respectively, which extend more than halfway relative to the total width of the intermediate portion 39 as well as the first and second hinged body portions 37—38, respectively. As can be best seen in FIGURE 3, the J-shaped interlock means including the J-shaped structures 41—42 integral with the hinged body portions 37—38, respectively, extend only up to halfway the total width of these intermediate and hinged body portions such that folding of the hinged body portions as represented in FIGURES 7 and 8 results in interference fit of the latching projections 43—44 to maintain folded positioning of the hinged body portions relative to the intermediate portion 39. Integral with each of the J-shaped interlock means 41—42 there can be oppositely extending semi-arcuate shank means 45 and 46 which terminate in semi-conical or barbed lug means 47 and 48 having semi-arcuate abutments, shoulders or laterally outwardly extending projections 49 and 50 provided adjacent to the shanks 45—46, respectively. Inclined or tapered surfaces 51 and 52 are relatively flat and adapted to be spaced a predetermined distance from each other when the shanks 45—46 and lug means 47—48, respectively, are in the folded position as illustrated by FIGURE 7. Outer peripheral surfaces of the shanks 45—46 are rounded to conform substantially to an inner periphery of a panel P outlined in FIGURE 7 and having an aperture A therein. The lug means 47—48 can be pressed toward each other to a limit defined by surface to surface contact of the flat sides 51—52 so as to flex the shoulders or abutments 49—50 out of engagement with one side of the mounting panel P. Once the barbed lug means or projections have been disengaged from a mounting panel aperture it is possible to effect release of the interlock or disengagement of the latching projections 43—44 by exerting force in opposite directions against edges of wings or flange means 53 and 54, respectively, while laterally flexing the shoulders or latching abutments 43—44 apart from each other. Width of the wings or flange means 53—54 is substantially equal to the depth dimension of the J-shaped interlock means 41—42, respectively, with which the wings or flange means are formed integrally though extending diagonally in opposite directions therefrom as apparent in FIGURE 3. These wings or flange means 53—54 improve and increase the area engageable edgewise for effecting folding and unfolding of the hinged body portions 37—38 and also these wings 53—54 serve to engage one side or a surface of the mounting panel P so as to enhance engagement of the shoulders or abutments 49—50 of the lug means against an opposite side or edge of the mounting panel P around the periphery of the aperture A therein. Engagement of the free edges of these wings or flange means 53—54 can aid in spreading apart the nose-like or semi-conical heads or lug means 47—48.

Further improvement in the clip means 36 includes the provision of V-shaped ribs or projections 56 in parallel relation to each other and extending semi-arcuately along peripheral surfaces of curved recesses 57, 58 and 59 of the first and second hinged portions 37 and 38 as well as the intermediate portion 39, respectively. These ribs or V-shaped projections 56 are adapted to engage outer angular peripheries of rods, wires, conduits and the like so as to maintain positioning thereof against sliding or axial movement during transverse engagement and embracing of the hinged body portions 37—38 and intermediate portion 39 relative to one or a pair of articles mounted therein. Longitudinally extending parallel conductors or wires provided with an insulating housing having a reduced thickness between the wires to facilitate ripping or separation of the conductors as a rip cord can be accommodated in open passage space defined by the folding of the hinged body portions relative to the intermediate portion as represented in views of FIGURES 7 and 8. The cross sectional view of FIGURE 6 illustrates the V-shaped ribs 56 carried by the hinged body portion 37. Assembly and disassembly of the clip means 36 transversely on one or two wires, for example, can be accomplished by application of manual pressure to the opposite edges of the wings or flange means 53—54 or by use of a tool such as pliers and the like to transmit force for separation of interlock or latching engagement of the projections 43—44. Optimum holding power on two wires that extend longitudinally and parallel to each other can be provided by the V-shaped ribs 56 in the complementary hinged body portions and intermediate portion without need for taping or further external wrapping and covering to hold the clip means in place. There is no need to provide holes during two-piece molding of the unitary clip means 36 since the hinged body portions and intermediate portion as well as the interlock means and projecting lugs can be molded in open condition subject to folding to embrace wiring, conduits, rods and the like.

FIGURES 9 and 10 illustrate another embodiment of an all-plastic locking-type harness clip means generally indicated by numeral 60 and having a generally angular body portion 61 with oppositely extending though mateable tapered ends 62 and 63. Substantially centrally and extending laterally from the body portion 61 there can be shank means 64 having opposite outer rounded peripheral surfaces as well as barbed lug means 65 similar in structure to the shanks 45—46 and lug means 47—48 described previously. The lug means 65 is adapted to be forced through an aperture 66 of a mounting plate 67 shown in FIGURE 9 which represents an exploded view in which the opposite tapered ends 62—63 are shown separated and apart from each other. The tapered end 62 includes multiple triangular-shaped ribs 68 on at least one side thereof and these ribs 68 provide abutments for engaging an edge or shoulder 69 provided adjacent to a passage or cutout 70 in the complementary tapered end 63.

In FIGURE 10 there is a similar interlocking or latching structure formed with a clip means to have an annular or arcuate body portion only a part of which is shown and represented by reference numeral 71 and terminating in opposite tapered ends 72 and 73. The tapered end 72 can be provided with triangular-shaped laterally extending ribs or projections 74 and 75 on opposite sides thereof and a passage 76 in the tapered end 73 can receive the tapered end 72 with a pair of abutments or shoulders 77 and 78 being provided on opposite sides of the passage 76. The shoulders 77 can be provided along one side of a bridge or flexible transverse portion 79 which can be deformed sufficiently to permit interference fit of the tapered ends 72—73 relative to each other.

It is to be noted that each of the pairs of tapered ends 62—63 and 72—73 can be adjustably latched or interlocked and the body portions 61 and 71 are totally nonconductive so as to eliminate any hazards of insulation wear to result in electrical shorting between a pair of electrical conductors or wires. Use of metal clips or clamps could result in wearing away insulation around wiring such that a short circuit can readily occur.

FIGURES 11 and 12 illustrate further modifications in all-plastic cable mounting clip means. In FIGURE 11 there is a harness clip means generally indicated by numeral 80 including a longitudinally extending body portion 81 with centrally located shanks 82 and 83 extending laterally therefrom and integrally with lug means 84 and 85 having semi-conical or barb-like configuration similar to that described previously and adapted to fit an aperture 86 of a mounting panel 87, a fragment of which is shown in FIGURE 11. Adjacent to each of opposite ends of the body portion 81 there can be a pair of laterally and transversely extending flange extensions 88 which project parellel to each other though in the same direction opposite to the direction of an intermediate wing or flange extension 89. Conductors or conduits C are adapted to be bundled as outlined in FIGURE 11 and can be "snaked" onto the clip means 80. In FIGURE 12 there is a harness mounting clip means generally indicated by numeral 90 with a body portion 91 having an offset intermediate portion 92 as well as opposite ends 93 substantially longitudinally in alignment with each other. A pair of lateral flanges or extensions 94 extend or project transversely relative to the body portion 91 and opposite ends 93 while an intermediate projection or extension 95 is provided integrally with the offset intermediate portion 92. Latching or fastening means similar to the shanks 82—83 and lug means 84—85 illustrated in FIGURE 11 can be provided along an underside of the body 91 of insulating material in a location coinciding substantially with the offset central portion 92. Use of the offset central portion 92 requires greater "snaking" of wiring or conductors which can thus be more firmly held in place though for both the clip means 80 and 90 there is no need to have an external wrapping or covering of tape as disclosed in a Patent 2,931,851—Sims belonging to the assignee of the present invention. Reference can be made also to copending applications Docket No. PE–4659 and Docket No. PE–4660 belonging to the assignee of the present invention and in which further all-plastic clip means for mounting conduits and conductors can be found.

In the clip means 80 and 90 of FIGURES 11 and 12 the triple extensions or tabs extending in opposite directions permit straddling and embracing of longitudinally extending conductors or conduits with the edges of the projections or tabs 88—89 and 94—95 tightly engaging the outer periphery of the conductors or conduits transversely thereof so as to obviate sliding or longitudinal movement of the conductors relative to the clip means and vice versa.

While the embodiments of the present invention herein disclosed constitute preferred forms, it is to be understood that other forms might be adopted.

What is claimed is as follows:

1. For use in installation of motor vehicle conduits, conductors and the like adjacent to an apertured panel, a clip means, comprising, a unitary body of moldable plastic material including a pair of opposite though complementary body portions initially extending in opposite directions in open condition, an intermediate portion integral between said pair of body portions, a pair of reduced thickness transverse hinges integrally to join said intermediate portion to said pair of body portions, complementary interlock means integral only with each of said body portions and engageable with each other to maintain tightly a particular embracing positioning of the complementary body portions and intermediate portion around longitudinally extending conduits, conductors and the like, barbed semi-arcuate lug means projecting from each of said body portions positionable adjacent to each other for installation in an apertured panel, arcuate gripping means provided along curved periphery of said pair of body portions as well as said intermediate portion for prevention of axial sliding of said clip means along the conduits, conductors and the like, and an angularly extending flange means of resilient insulating material integral with each of said pair of body portions, said flange means both enhancing engagement of said semi-arcuate lug means as installed in an apertured panel as well as facilitating application of force for engagement and disengagement of said interlock means integral with said body portions.

2. The clip means of claim 1 wherein said gripping means includes groups of substantially parallel V-shaped ribs integral along semi-arcuate recessing in said pair of body portions and intermediate portion which define substantially circular inner peripheries when said interlock means are in engagement with each other regardless of mounting with the apertured panel.

3. The clip means of claim 1 wherein said interlock means include mating abutments along a J-shaped section of each of said pair of body portions, said flange means being transversely integral on opposite though complementary sections.

4. The clip means of claim 1 wherein said interlock means include mating abutments extending slightly more than only one-half the width of said pair of body portions and intermediate portion, said flange means having a width substantially equal to total depth of said interlock means and including free ends projecting in substantially the same direction as said lug means.

5. For use in installation of motor vehicle conduits, conductors and the like adjacent to an apertured panel, a clip means, comprising, a unitary body of moldable plastic material including a pair of opposite though complementary body portions initially extending in opposite directions in open condition, an intermediate portion integral between said pair of body portions and having a reduced thickness throughout as a transverse hinge integrally to join said pair of body portions thereby, complementary interlock means integral only with each of said body portions and engageable with each other to maintain tightly a particular embracing positioning of complementary body portions and intermediate hinge portion around longitudinally extending conduits, conductors and the like, barbed semi-arcuate lug means projecting from at least one of said body portions positionable adjacent to each other for installation in an apertured panel, arcuately disposed axial V-shaped gripping means provided along curved periphery of pairs of semi-arcuate recesses parallel to each other integrally with said pair of body portions aside from said intermediate hinge portion, said gripping means along curved periphery of said pair of body portions hinged by said intermediate portion in a particular unitary embracing positioning around longitudinally extending conduits, conductors and the like tightly preventing axial turning about particularly as well as axial sliding of said clip means along the conduits, conductors and the like, said interlock means including a substantially U-shaped extension of resilient insulating material integral with one of said pair of body portions for interlock with a complementary tapered latch projecting portion integral with another of said pair of body portions integrally held thereby in a closed-loop position during panel aperture mounting unitarily subject to application of force for engagement and disengagement of said interlock means integral with said body portions.

References Cited in the file of this patent

UNITED STATES PATENTS

| | | |
|---|---|---|
| 1,129,782 | Gidley et al. | Feb. 23, 1915 |
| 1,585,840 | Fahnestock | May 25, 1926 |
| 2,058,733 | Smith | Oct. 27, 1936 |
| 2,931,851 | Sims | Apr. 5, 1960 |
| 2,977,145 | Rifkin | Mar. 28, 1961 |

FOREIGN PATENTS

| | | |
|---|---|---|
| 599,050 | Great Britain | Mar. 3, 1948 |
| 873,304 | Great Britain | July 19, 1961 |
| 874,813 | Great Britain | Aug. 10, 1961 |
| 1,012,983 | Germany | Aug. 1, 1957 |

OTHER REFERENCES

"IBM Technical Disclosure Bulletin," vol. 2, No. 1, June 1959.